E. M. HUNTER.
MUSIC CHART.
APPLICATION FILED MAY 16, 1905.

954,436.

Patented Apr. 12, 1910.
3 SHEETS—SHEET 1.

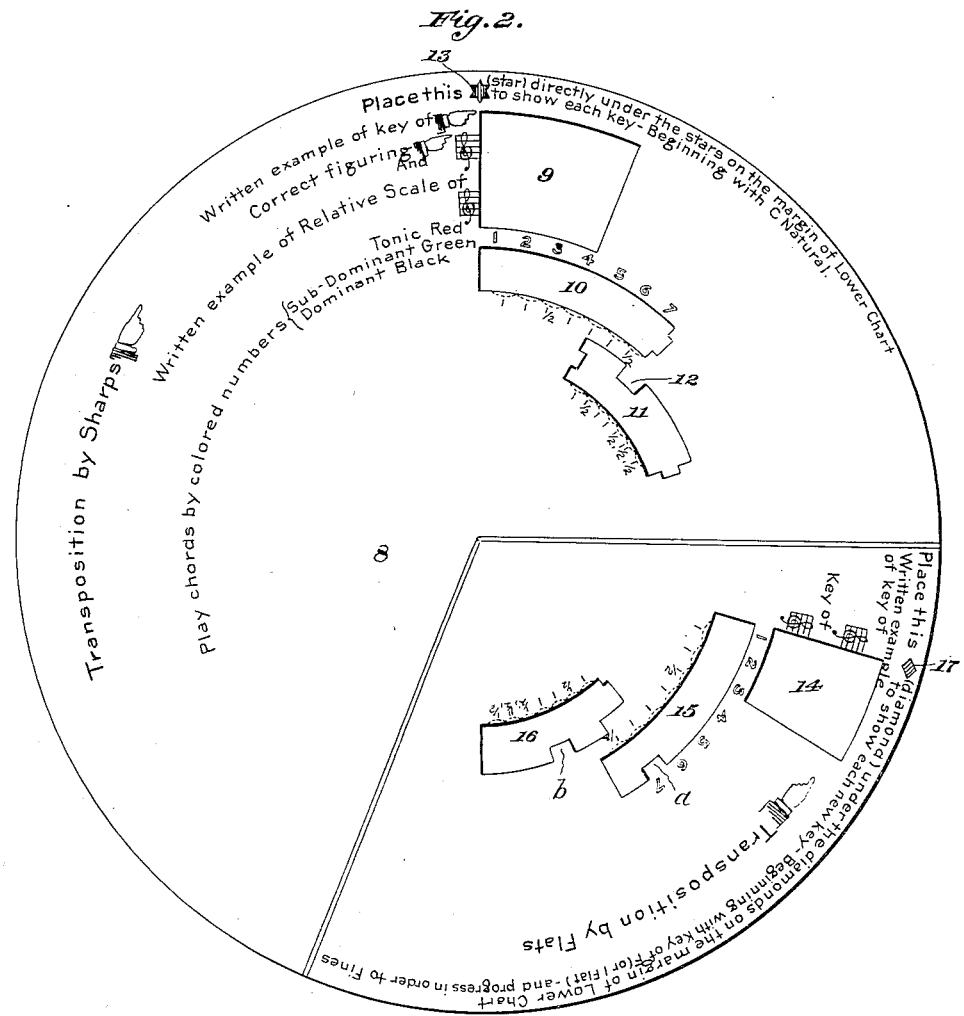

UNITED STATES PATENT OFFICE.

EFFIE M. HUNTER, OF BLOOMINGTON, INDIANA.

MUSIC-CHART.

954,436.  Specification of Letters Patent.  Patented Apr. 12, 1910.

Application filed May 16, 1905. Serial No. 260,705.

*To all whom it may concern:*

Be it known that I, EFFIE M. HUNTER, a citizen of the United States, residing at Bloomington, in the county of Monroe and State of Indiana, have invented certain new and useful Improvements in Music-Charts, of which the following is a specification, reference being had therein to the accompanying drawing.

The invention relates to music charts.

The object of the invention is to provide a chart of a simple and inexpensive character to aid in the transposition of music into different keys and to also serve to indicate in staff notation the scale of each major key, its relative minor key and their respective chords together with their relative location on the keyboard and the correct fingering.

The primary object of the invention is to provide an improved type of chart to aid in the transposition of music into different keys, and to also serve to indicate in staff notation the scale of each major key, its relative minor key, and their respective chords, together with their relative location on the key-board, and the correct fingering.

In carrying out the invention staff notation arranged in groups and indicating mediums showing the parts of an instrument to be operated in playing said staff notation is furnished; and one of the chief aims of the invention is to provide a chart containing a sufficiently large amount of such memorandum so arranged and having its parts so correlated that by the use of the chart any particular group of staff notation and data for indicating the parts of an instrument to be operated in playing said staff notation may be simultaneously exposed to view, and such exposition be made entirely independent of and separate and distinct from the other staff notation and data indicating the parts of an instrument to be operated in playing said staff notation, whereby the confusion resulting from having a large amount of memorandum always exposed to view is obviated.

A further object is to provide a device of this character of simple and compact form, and one easily and quickly operated, and readily understood.

A convenient embodiment of the invention comprises the construction and arrangement of parts hereinafter described, illustrated in the accompanying drawings, and particularly pointed out in the appended claims.

Figure 1:
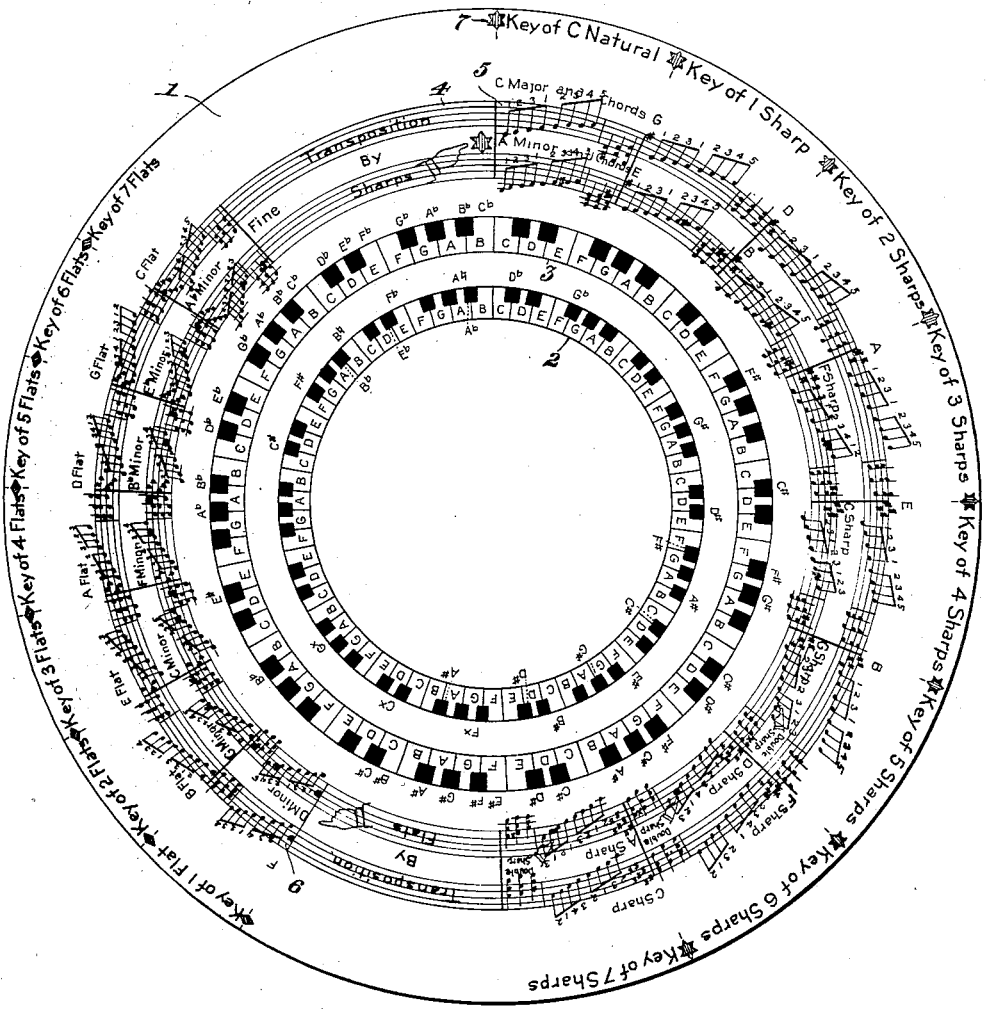
Figure 4:
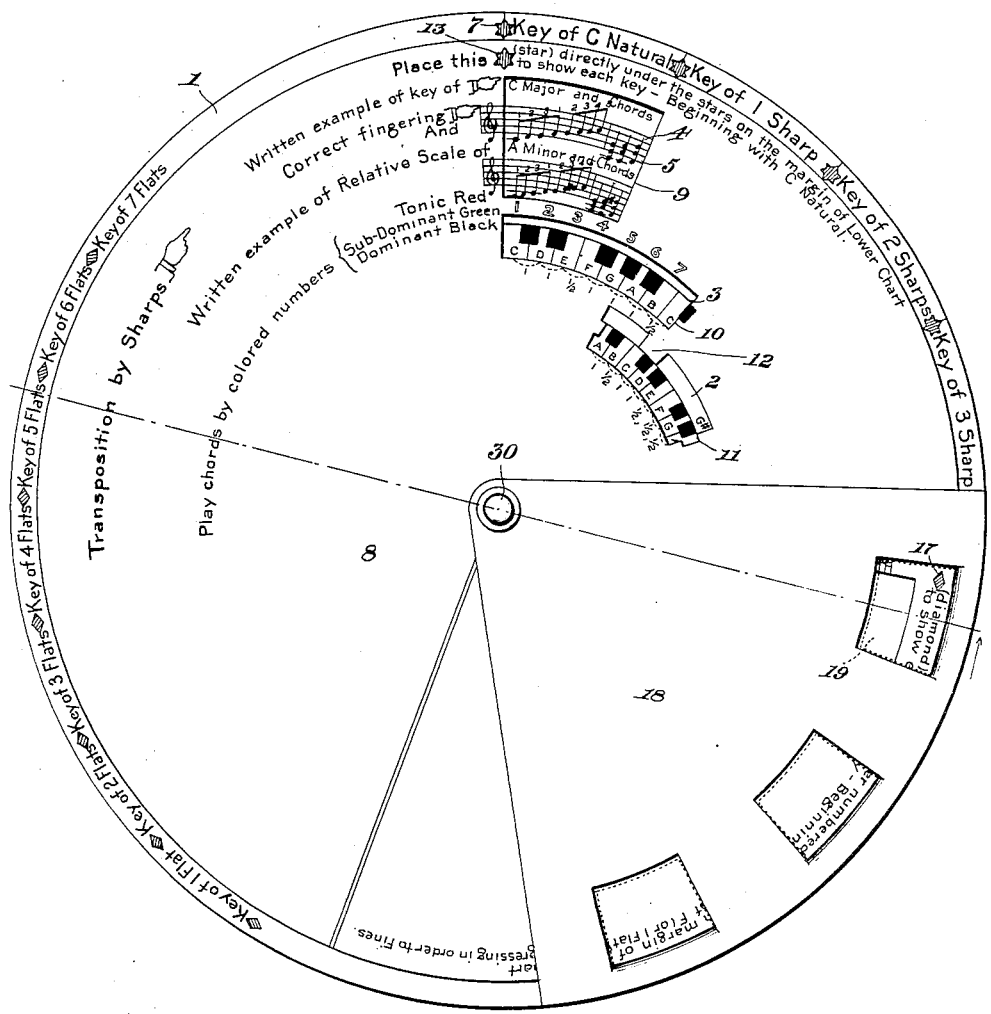
Figure 3:
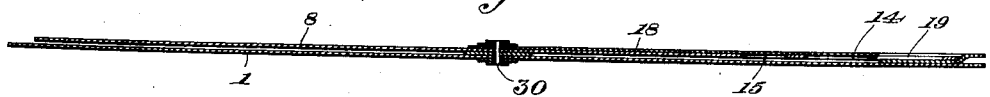

In the drawings; Figure 1 is a top plan view of the lower sheet or disk. Fig. 2 is a similar view of the upper sheet or disk. Fig. 3 is a top transverse section. Fig. 4 is a view with the parts assembled.

Referring more specifically to a detailed description of the drawings, wherein like reference characters designate corresponding parts throughout the several views; 1 designates a rear sheet or disk, which is divided into three circular fields, 2, 3, 4, arranged concentrically with the center of the sheet or disk and spaced apart. The outer field 4 is divided into two series of radial panels 5 and 6, separated from each other by intervening spaces. In the series of panels 5 is produced in staff notation the transposition by sharps, beginning with the key of C natural and continuing in regular order, each panel of the series containing the scale of a major key and its chords and arranged directly below the same the scale of its relative minor key and its chords together with characters adjacent the staff notation to indicate the correct fingering. In the series of panels 6 is similarly produced the transposition by flats. Near the outer edge of the rear sheet or disk and at the head of each panel is produced a sign designating the major key of the particular major scale contained within each of the several panels and to the left of each sign a symbol 7. The symbols 7 produced at the heads of the panels forming the series designated by the numeral 5 are preferably of a different color and of a different design from those placed at the heads of the panels forming the series designated by 6 for a purpose hereinafter described. In each of the fields 2 and 3 is produced the representation of a key-board, illustrated in this particular instance in the drawings as the key-board of a piano although as is obvious the invention can be made to apply just as well to the key-board of any musical instrument. The fields 2 and 3 are for the purpose of indicating the location on the key-board of the keys to be operated in playing the several scales and chords of the major and minor keys produced in the series of panels 5 and 6 and with this purpose in view the keys of the key-board that are to be operated in playing the major scales and chords beginning with the key of C natural are indicated by letters and characters on the key-board represented in field 3 and the keys that are to be operated in playing the minor scales and chords beginning with the key of A minor are indicated by letters and characters on the key-board represented in field 2. These letters and characters for indicating the keys of the key-boards are all placed directly on the keys of the key-board with the exception of some few characters and letters which are placed above the key-boards at the heads of the keys for a purpose to be hereinafter described.

On the rear sheet or disk 1 is rotatably mounted a front sheet or disk 8, a double-headed pivot pin 30 passing through both the sheets at the centers thereof and serving to connect the same. The sheet or disk 8 is provided with three sector shaped slots 9, 10, 11, arranged one above the other with a portion of each slot overlapping a portion of the next adjacent slot. The slot 9 is of a shape and size corresponding to the shape and size of the panels of the series 5 and is adapted to be moved over the same to register with any one of them to expose to view the data contained therein. The slots 10 and 11 are arranged to move over the fields 3 and 2 respectively to expose separately certain portions of the key-boards represented therein, on which portions of the key-boards will be indicated by letters and characters the corresponding keys to be operated in playing the scales produced in the panel exposed to view through the slot 9 and along the upper edge of slot 10 are produced on sheet 8 numbers for indicating which keys are to be operated in playing the chords of the scales produced in the panel exposed to view through the slot 9, the numbers indicating the keys to be operated in playing one chord being all of the same color but differing in color from the numbers indicating the keys to be operated in playing other chords. On the upper sheet or disk 8 at the base of the slots 10 and 11 are produced two series of curved lines and figures for indicating the whole and half intervals or steps in the respective scales. The slot 11 is a little wider than the key-board represented in the field 3 for the purpose of exposing the letters and characters placed on sheet 1 above the keyboard in the same field 2 at the heads of the keys and these particular characters and letters are so placed because they indicate keys which are to be operated in playing one scale but are not to be operated in playing another scale and are exposed to view after the slot 9 has been caused to register with the succeeding panel. These particular characters and letters are conveniently covered up when not needed by a tab 12, which projects within the slot 11 from the front edge thereof. The upper sheet or disk 8 is of a diameter slightly less than the diameter of the rear sheet or disk 1 so that the symbols 7 and the signs designating the major keys at the heads of the two series of panels 5 and 6 are left exposed to view. Near the outer edge of the front sheet or disk above the slot 9 to the upper left hand corner thereof is a symbol 13, which marks the beginning of the slot 9 and is of a similar color and design as the symbols 7 placed at the heads of the panels forming the series designated by 5. When the symbol 13 is in alinement with any one of the symbols 7 placed at the heads of the panels forming the series designated by 5 the slot 9 is caused to register with one of the panels, the symbols 7 and 13 thus constituting a guide by which the front sheet or disk can be quickly rotated to the desired position in order to expose a certain panel to view. When the slot 9 registers with a certain panel the scale of a major key and its chords and its relative minor key and its chords are exposed to view through said slot 9 and through the slots 10 and 11 is exposed data indicating the relative location of the keys to be operated in playing the respective scales and chords exposed through the slot 9.

The front sheet or disk 8 is provided with three additional sector shaped slots 14—15—16 which are of the same general arrangement as the slots 9—10—11 and operate in like manner and bear the same relation to the series of panels 6 and the fields 2 and 3 as the slots 9—10—11 do to the series of panels 5 and the fields 2 and 3. Near the outer edge of the front sheet or disk 8 above the slot 14 to the upper left hand corner thereof is a symbol 17, which marks the beginning of the slot 14 and is of a similar color and design to the symbols 7 produced at the head of the panels forming the series designated by 6. From this it will be understood that by alining the symbol 17 with the symbols 7 at the heads of the panels forming the series designated by 6 the transposition by flats can be obtained in a manner similar to the manner in which the transposition by sharps is obtained. The slots 15 and 16 are a little wider than the key-boards represented in the fields 2 and 3 for the purpose of exposing the letters and characters placed on sheet 1 above the keyboards at the heads of the keys and projecting within the slots 15 and 16 from the upper edges thereof are tabs $a$ and $b$ arranged in a similar manner to the tab 12 and for a like purpose. On the upper sheet or disk 8 to the left of the slots 9 and 14 and near the edges thereof are produced clefs to accord with the staff notation arranged on the lower sheet or disk 1 in the field 4.

In order to prevent confusion between the transposition by sharps and the transposition by flats I provide a sector shaped sheet 18, which is mounted on the pivot-pin 9 to turn thereon and is adapted to be moved around over the front sheet or disk 8 to cover up when not in use either the slots 9—10—11 or the slots 14—15—16. The curtain 18 is provided with a plurality of tongues 19, which are adapted to be bent over and beneath the outer edge of the front sheet or disk 8 to frictionally lock the curtain at any desired position on the front disk. The tongues 19 are formed by making U shape slits in the curtain near the outer edge thereof so that the base of the tongues 19 are located a slight distance beyond the outer edge of the front sheet or disk 8.

As will be apparent in a chart constructed after the manner set forth, the particular arrangement of memorandum is an important factor, the same being intimately associated with the constructive features of the device and combining therewith to produce the desired results.

It will be understood that various changes within the scope of the appended claims may be made in the form and construction hereinbefore described without departing from the spirit or sacrificing any of the advantages of the invention.

What I claim is:

1. In a device of the class described, a rear member having displayed thereon two groups of data, a front member movable over the rear member and provided with two sets of sight openings, each set of sight openings being adapted to register with portions of one of the groups of data, and a curtain movable over the front member to cover up either one of the sets of sight openings.

2. In a device of the class described, a rear member having displayed thereon two groups of data, a front member movable over the rear member and provided with two sets of sight openings, each set of sight openings being adapted to register with portions of one of the groups of data, a curtain movable over the front member to cover up either one of the sets of sight openings, and means for holding the curtain from movement relative to the front member.

3. In a device of the class described, a rear member having displayed thereon two groups of data, a front member movable over the rear member and provided with two sets of sight openings, each set of sight openings being adapted to register with portions of one of the groups of data, a curtain movable over the front member to cover up either one of the sets of sight openings, and provided near one edge with tongues to be bent over and beneath one edge of the front member to hold the curtain from movement relative to the front member.

4. In a device of the class described, a rear member having displayed thereon the staff notation of certain sets of scales arranged in two groups spaced apart and data indicating the parts of an instrument to be operated in playing said scales consisting of the representation of two key-boards with characters placed on and above the keys, and a front member movable over the rear member and provided with two sets of sight openings to register with separate portions of the staff notation and the data displayed on the rear member, a tab projecting within one of the sight openings of one set and tabs projecting within two of the sight openings of the other set to aline with and cover up the characters placed on the rear member above the keys of the key-boards when these characters indicate keys not to be operated in playing a certain scale.

5. In a device of the class described, a rear member having displayed thereon the staff notation of certain sets of scales and data indicating the parts of an instrument to be operated in playing said scales consisting of the representation of a key-board with characters placed on and above the keys to be operated, and a front member movable over the rear member and provided with sight openings to register with separate portions of the data displayed on the rear member and tabs projecting within the sight openings from the upper edge thereof to aline with and cover up the characters placed on the rear member above the keys of the key-board when these characters indicate keys not to be operated in playing a certain scale.

6. In a device of the class described, a rear member having displayed thereon in separate series of divisions the staff notation of certain sets of scales, symbols produced adjacent the divisions in each series, the symbols adjacent one series of divisions being of a like character but differing from the symbols produced adjacent the divisions of other series, and data indicating the parts of an instrument to be operated in playing said scales, a front member movable over the rear member and provided with sets of sight openings and a symbol produced on the front member adjacent each set of sight openings of a character similar to the symbols produced on the rear member adjacent the divisions of one series, for alinement therewith and a curtain movable over the front member to cover up one or the other of the sets of sight openings.

7. In a device of the class described, a rear member having displayed thereon in separate series of divisions the staff notation of certain sets of scales, and data indicating the parts of an instrument to be operated in playing said scales; a front member mounted for rotation on the rear member and provided with sets of sight openings to register with the divisions of each respective series displayed on the rear member and also with portions of the data displayed on the rear member for indicating the parts of an instrument to be operated in playing said scales, and a curtain mounted for rotation above the front member.

8. In a device of the class described, a rear member having three circular fields arranged concentric with the center thereof, the outer of said fields being divided into two series of radial panels, one series of panels having produced therein the staff notation of certain major and minor scales illustrating the transposition by sharps and the other series of panels having produced therein the staff notation of certain major and minor scales illustrating the transposition by flats and each panel of the two series containing a major scale and its chords and its relative minor and its chords and characters adjacent the staff notation to indicate the correct fingering, the intermediate field having produced therein the representation of a key-board and characters for indicating the parts of an instrument to be operated in playing the major scales, and the inner field having produced therein the representation of a key-board and characters for indicating the parts of an instrument to be operated in playing the minor scales, a front member mounted for rotation on the rear member and provided with two sets of segmental slots each set comprising three slots arranged one above the other, the upper slot of one set adapted to register with the radial panels of one series and the upper slot of the other set adapted to register with the radial panels of the other series and the other slots of each series adapted to register respectively with portions of the data contained in the intermediate and inner fields, and a segmental curtain mounted for rotation above the front member.

9. In a device of the class described, a rear member having displayed thereon in separate series of divisions the staff notation of certain sets of scales, and data indicating the parts of an instrument to be operated in playing said scales; a front member mounted for rotation on the rear member and provided with sets of sight openings to register with the divisions of each respective series displayed on the rear member and also with portions of the data displayed on the rear member for indicating the parts of an instrument to be operated in playing said scales, a curtain mounted for rotation above the front member, and means for holding the curtain to the front member.

In testimony whereof I affix my signature in presence of two witnesses.

EFFIE M. HUNTER.

Witnesses:
GEORGE D. HUNTER,
SAM M. HUNTER.